Jan. 24, 1967  J. K. GOGIA ETAL  3,300,647
ALTERNATOR LOAD DEMAND SEQUENCING SYSTEM
Filed Oct. 28, 1963  4 Sheets-Sheet 1

INVENTORS
Jugal K. Gogia
BY William L. Hinde
Kurt Seldner
ATTORNEYS

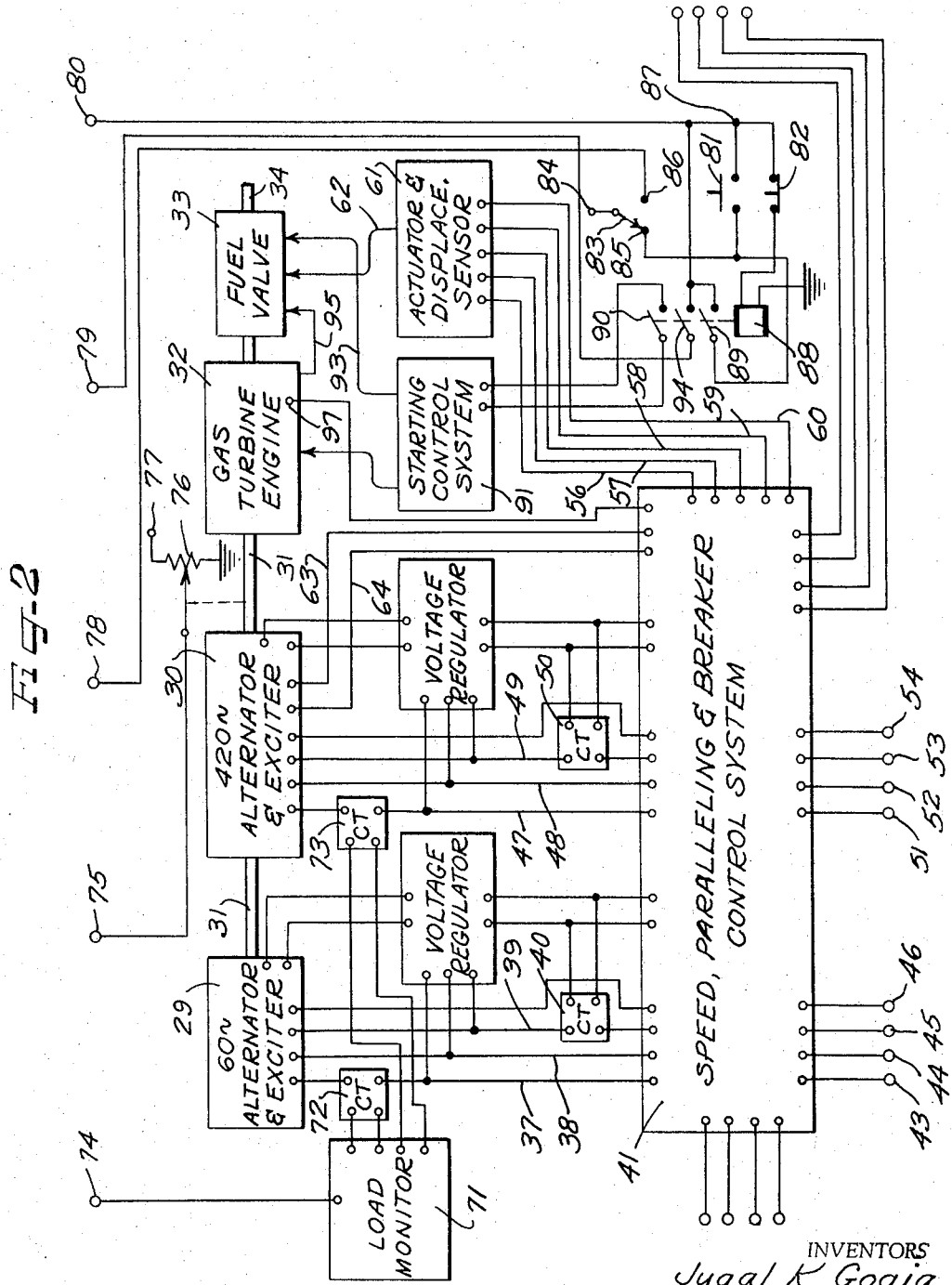

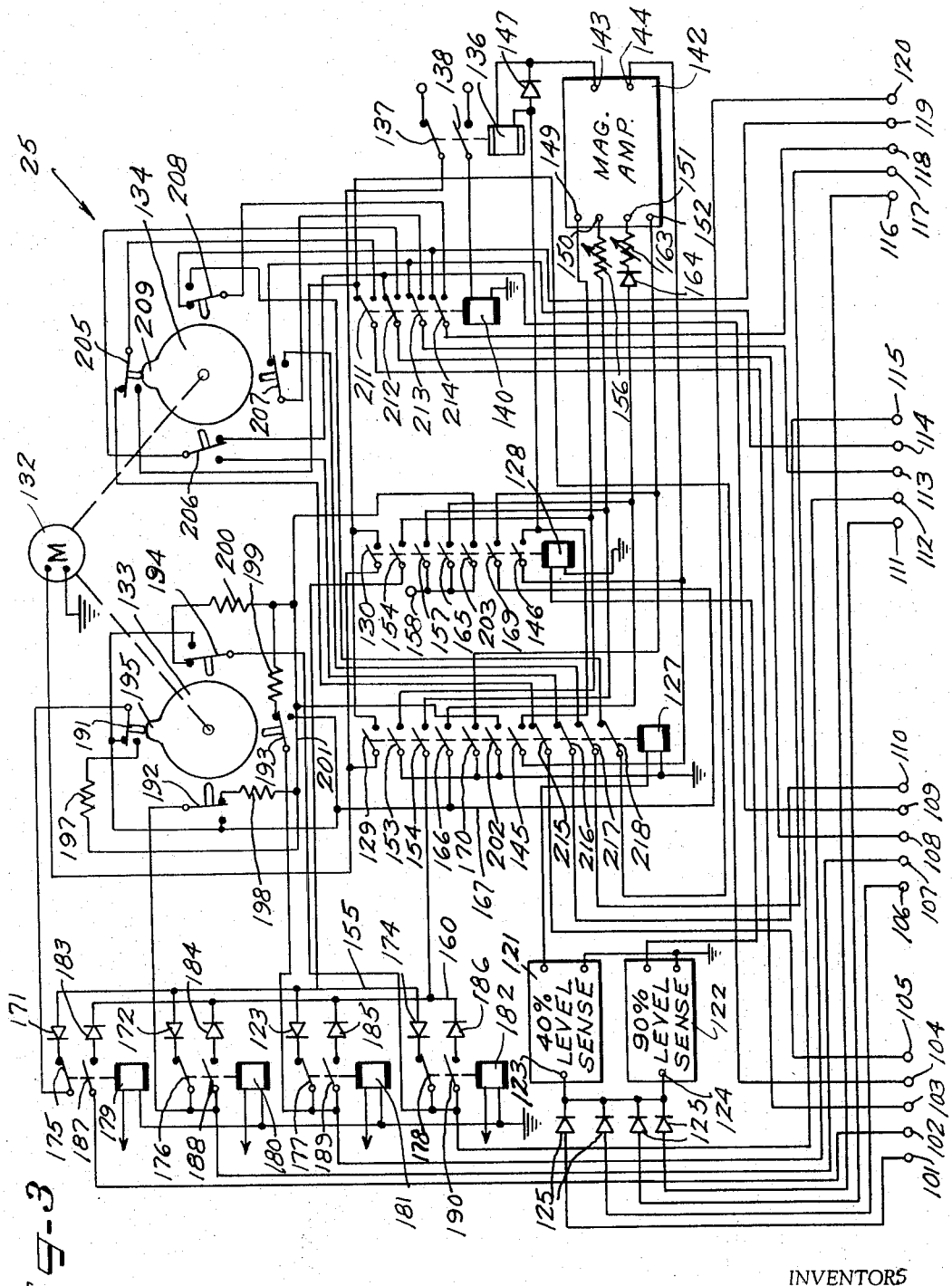

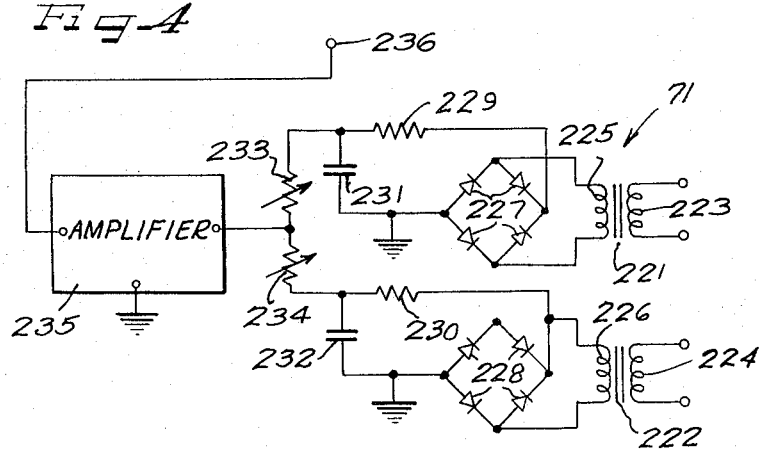
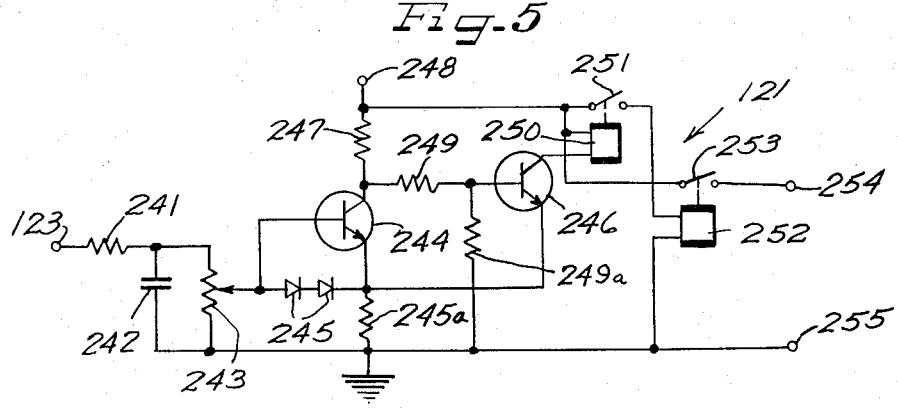
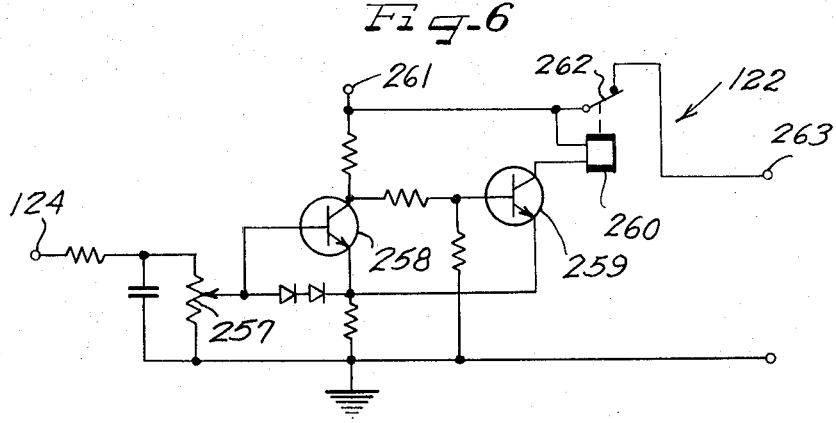

United States Patent Office 3,300,647
Patented Jan. 24, 1967

3,300,647
ALTERNATOR LOAD DEMAND SEQUENCING SYSTEM
Jugal K. Gogia, Cleveland Heights, William L. Hinde, Euclid, and Kurt Seldner, University Heights, Ohio, assignors to TRW Inc., a corporation of Ohio
Filed Oct. 28, 1963, Ser. No. 319,169
11 Claims. (Cl. 290—30)

This invention relates to a load demand sequencing system in which the operation of generator units is controlled automatically in a manner to obtain high efficiency and to equalize running times of the units.

The system was specifically designed for a system for producing electrical energy from natural gas, wherein a plurality of modules or units are provided each including a gas turbine and at least one alternator driven thereby, with means for parallelling the alternators. The system preferably may be used to supply A.C. at two frequencies (60 and 420 cycles) or more, with a plurality of alternators driven by each turbine. It will be understood, of course, that the sequencing control of this invention may be applied in other applications.

According to this invention, a control signal is developed by a loadsensing circuit when the load on the unit having the highest load shifts between a value above and a value below a certain value, and the control signal is used to control operation of a unit. Preferably, control signals are developed for both the automatic start and the automatic stop of a unit. For example, an additional unit may be started when the load on the unit having the highest load shifts above 90% of rated load, or an operative unit may be shut down when the load on the unit having the highest load drops below 40% of rated value. With this arrangement, units are always operated at a relatively high output level, at which efficiency is high, but with protection against excessive loads.

A very important feature of the invention is in the control of the units in accordance with running time signals in a manner to equalize running times. In accordance with this feature, a start signal derived from the load sensing circuit is automatically applied to the unit having the least effective running time, while a stop signal is applied to the unit having the greatest effective running time. With operation of the system over any substantial period of time, wherein the load shifts periodically over a relatively wide range, the accumulated running times of the units will be substantially equalized.

Additional important features of the invention reside in the circuits for producing the automatic start and stop signals and applying such signals to the proper units, with a high degree of reliability and efficiency.

This invention contemplates other and more specific objects, features and advantages which will become more fully apparent from the following detailed description taken in conjunction with the accompanying drawings which illustrate a preferred embodiment and in which:

FIGURE 2 is a schematic diagram of one of the turbine-alternator units of the system of FIGURE 1, the other units being identical thereto;

FIGURE 3 is a schematic diagram of the load demand sequencing control illustrated in block form in FIGURE 1;

FIGURE 4 is a schematic diagram of a load monitor circuit illustrated in block form in FIGURE 2;

FIGURE 5 is a circuit diagram of a 40% load level sensing circuit illustrated in block form in FIGURE 3; and FIGURE 6 is a schematic diagram of a 90% load level sensing circuit illustrated in block form in FIGURE 3.

Figure 1:
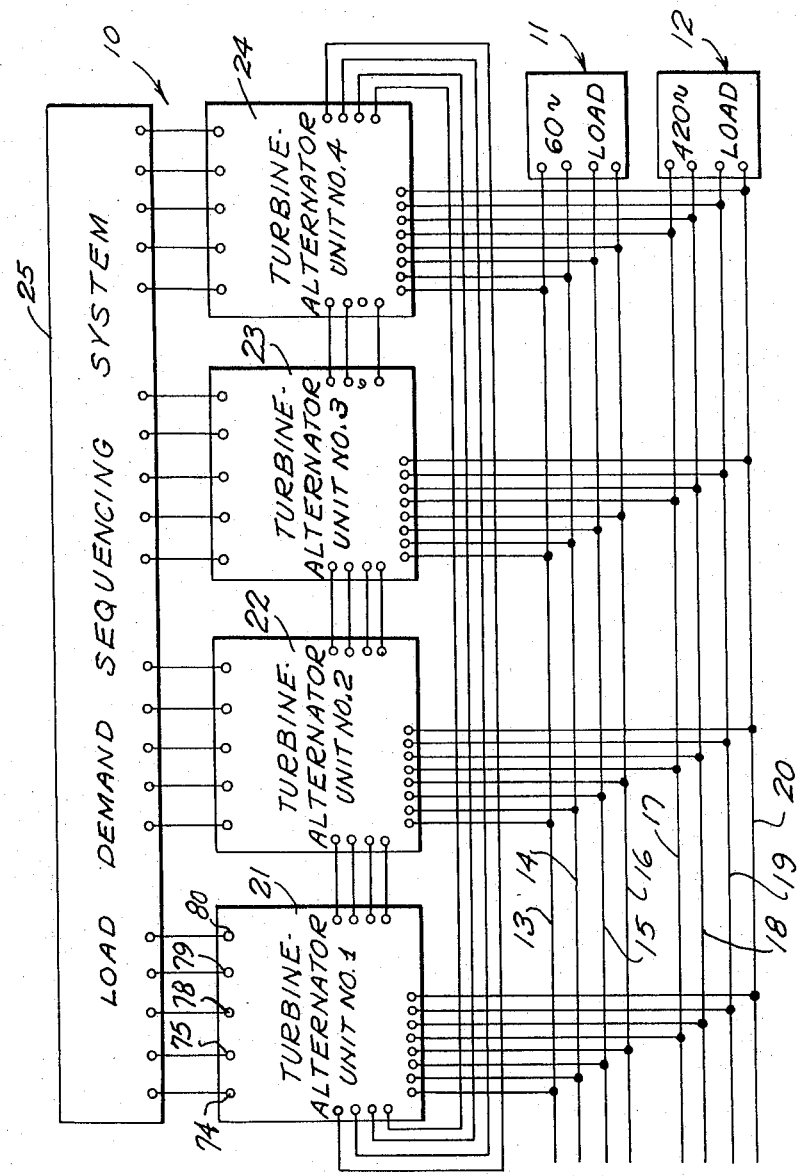
FIGURE 1 is a block diagram of an electrical power generating system including four turbine-alternator units and a load demand sequencing control of this invention.

Reference numeral 10 generally designates an electrical power generating system constructed according to the principles of this invention and arranged for supplying 60 cycle, three phase A.C. current to a load 11 and 420, three phase A.C. current to a load 12, from A, B and C phase and neutral buses 13, 14, 15 and 16 connected to the 60 cycle load 11 and A, B and C phase and neutral buses 17, 18, 19 and 20 connected to the 420 cycle load 12.

The illustrated system comprises four turbine-alternator units 21, 22, 23 and 24 of identical construction, respectively designated also as unit No. 1, unit No. 2, unit No. 3 and unit No. 4. Each unit has eight output terminals connected to the buses 13-20 and five terminals to a load demand sequencing control 25 constructed according to this invention, the circuit thereof being illustrated in FIGURE 3 and described below. In brief, the control 25 operates when the load is less than 40% of the capacity of one unit to stop the unit having the greatest running time and it operates when the total load is greater than 90% of the capacity of one unit to start the unit haivng the least running time.

Each of the units 21-24 additionally has terminals connected to sensing circuits therewithin and interconnected with like terminals of the other units to obtain real and reactive load balance among those units in operation. The operation of such circuits is not part of the present invention, but they are disclosed and claimed in our copending application entitled "Modular Gas Turbine Energy System," Serial No. 319,203, filed October 28, 1963.

FIGURE 2 shows the construction of the turbine-alternator unit 21, the construction of the other units 21-24 being identical thereto. As shown, a 60 cycle alternator 29 and a 420 cycle alternator 30 are driven from a common shaft 31 which is driven by a gas turbine engine 32 to which fuel is supplied through a valve 33 from a supply line 34. The 60 cycle alternator 29 has A, B and C phase output buses 37, 38 and 39 and a neutral bus 40 connected through breaker contacts within a speed, parallelling and breaker control system 41 to terminals 43–46 which are connected to the main 60 cycle buses 13–16. Similarly, the 420 cycle alternator 30 has A, B and C phase buses 47, 48 and 49 and a neutral bus 50 connected through breaker contacts in the system 41 to terminals 51–54 which are connected to the main 420 cycle buses 17–20.

The system 41 is connected through lines 56–60 to an actuator and displacement sensor unit 61 which controls a section of the fuel valve 33 through a line 62 as diagrammatically illustrated. The system 41 is not by itself a part of the present invention and is therefore not illustrated in detail, but is disclosed and claimed in our copending application entitled, "Modular Gas Turbine Energy System," Serial No. 319,203, filed October 20, 1963. In brief, it operates in response to current and voltage signals and further in response to a speed signal derived from the 420 cycle alternator 30 through lines 63 and 64, to control acceleration of the alternators to the proper speed and to proper phase relation to the voltages on the main buses 13–20, and to operate breaker contacts therewithin to place the alternators on the line. The system 41 also has terminals connected to sensing circuits therewithin and connected to terminals of the other units to obtain real and reactive load balance among those units in operation, as disclosed in our copending application.

The unit 21 as illustrated in FIGURE 2 additionally comprises a 60 cycle voltage regulator 69 and a 420 cycle voltage regulator 70 which respond to current and voltage signals to control exciters incorporated in the alternators 29 and 30, to control the field excitation of the alternators and thereby control the output voltages.

The unit 21 further has a load monitor circuit 71 having two inputs connected to current transformers 72 and 73 in the 60 cycle and 420 cycle A buses 37 and 47, and having an output connected to a terminal 74 which is connected to the load demand sequencing control 25. Another terminal 75, connected to the load demand sequencing control 25, is connected to the movable contact of a potentiometer 76 connected between ground and a constant voltage terminal 77, the contact of the potentiometer being mechanically driven from the shaft 31 through a gear reduction, such that its position and hence the voltage thereof indicate the accumulated running time of the unit. Additional terminals 78, 79 and 80 are connected to the load demand sequencing control 25 and are also connected to starting control circuitry of the unit in a manner such that the unit may be started and stopped auomatically from the sequencing control 25.

The unit 21 may be started and stopped manually, rather than automatically, by operation of start and stop push buttons 81 and 82. Manual or automatic control is selected by a selector switch contact 83 connected to a voltage supply terminal 84 and selectively engageable with a contact 85 connected to the manual start switch, or with a contact 86 connected to the terminal 78. With contact 83 in the manual position as illustrated, depression of the start button 81 supplies voltage to a circuit point 87 which is connected through the stop switch 82 to a relay 88, to thereby energize the relay 88. A holding contact 89 is then closed and another contact 90 is closed to complete a circuit in a starting control system 91 which is connected to the engine 32 and to the fuel valve 33 as diagrammatically illustrated by the lines 92 and 93. It may be noted that for automatic operation, the contact 83 is engaged with the contact 86 and a circuit is completed in the sequencing control 25 to connect terminals 78 and 80 together and to thereby energize the relay 88, after which a holding circuit is completed through a contact 94 of the relay 88 connected between circuit point 87 and the terminal 79. To automatically stop operation, the holding circuit may be opened within the sequencing control 25. The operation may also be stopped at all times by depression of the stop button 82 to open the circuit of the relay 88, regardless of the position of the selector switch 83.

The construction of the starting control system 91 is not illustrated in detail since it is known in the art, but the general mode of its operation will be described, to facilitate an understanding of various features of the invention as described below. In brief, when the start relay 88 is energized to close the contact 90, a circuit is completed in the system 91 and various functions are then performed in sequence. First, a purge cycle is initiated wherein the engine 32 is cranked at a relatively low speed to get rid of any excessive amounts of gas that may have collected therein. The engine 32 is then cranked at a higher speed while an ignition system is activated and when the temperature reaches a certain value, a section of the fuel valve 33 is opened, through the control line 93 as diagrammatically illustrated, to supply the main operating gas to the engine 32. The engine then accelerates on what is termed as a fuel schedule, wherein a section of the fuel valve 33 is controlled in response to compressor discharge pressure in the engine 32 through a line 95 as diagrammatically illustrated, to limit acceleration to a predetermined safe value.

When the engine speed reaches approximately 90% of the rated speed, the fuel acceleration limiting action is removed and at the same time, a centrifugal switch or the like driven by the engine 32 develops a signal at a terminal 97 which is connected to a terminal 98 of the speed, parallelling and breaker control system 41. System 41 then controls acceleration of the engine 32 by controlling a section of the fuel valve through the unit 61. Initially, the system 41 operates with a type of action referred to as proportional action, wherein the speed is brought up to a speed close to rated speed, without danger of overshooting or any form of oscillation or instability. Then, after a time delay, an integral or rate control action is used to bring the speed to the exact rated value.

After the proper speed is reached, the phase of the output of the alternator 29 is compared with the phase on the main 60 cycle buses 13–16 until synchronization is established, and breaker contacts are then closed within the system 41 to place the 60 cycle alternator on the line. Load division circuitry of the system 41 is then brought into operation to balance the 60 cycle load between units, after which the 420 cycle alternator is synchronized with the line and breaker contacts are closed to place the 420 cycle alternator on the line.

FIGURE 3 is a circuit diagram of the load demand sequencing control 25 which has five input terminals 101–105 connected to the terminals 74, 75, 78, 79 and 80 of the unit 21, and input terminals 106–120 in three groups of five each connected to similar terminals of the units 22–24. It is noted that the control as illustrated is arranged for control of four units only, but can be readily modified to accommodate any number as desired, by using selector switches having additional positions, relays having additional contacts, etc.

The control 25 comprises a 40% level sensing circuit 121 and a 90% level sensing circuit 122 having input terminals 123 and 124 connected through diodes 125 to the terminals 101, 106, 111 and 116 which are connected to the outputs of the respective load monitor circuits of the units 21–24.

When the load on the unit having the highest load drops below 40% of rated value, the 40% level sense circuit 121 energizes a relay 127 from the output thereof, or when the load on the unit having the highest load exceeds 90% of rated value, a relay 128 is energized from the output of the 90% level sense circuit 122. The energization of relay 127 thus indicates that a unit then running should be shut down, while energization of relay 128 indicates that an additional unit should be started up.

Upon energization of either the shut-down relay 127 or the start-up relay 128, a contact 129 of the relay 127 or a contact 130 of the relay 128 is closed to energize a motor 132 which drives a pair of selector or scanning switch cams 133 and 134 until a position is reached corresponding to the unit having the highest running time, when shut-down relay 127 is energized, or corresponding to the unit having the least running time, when start-up relay 128 is energized.

A relay 136 is then energized to open a contact 137 thereof and deenergize the motor 132 while a contact 138 is closed to energize a relay 140. If shut-down relay 127 is energized, the unit then operating and having the highest running time is shut down while if start-up relay 128 is energized, the unit then not operating and having the least running time is started up.

The relay 136 is energized from a magnetic amplifier 142, one terminal of the relay being connected directly to an output terminal 143 of the amplifier 142 and the other terminal of the relay being connected to a second output terminal 144, through contacts 145 and 146 of relays 127 and 128 connected in parallel. A diode 147 is connected in parallel with relay 136.

The magnetic amplifier 142 has four input terminals 149–152 connected in a null-sensing network such as to develop an output from the magnetic amplfier to energize relay 136 when the selector switch cams 133 and 134 are at the proper positions.

Input terminal 149 is connectable through a normally open contact 153 of the relay 127 to ground or through a normally open contact 154 of the relay 128 to a line 155. Input terminal 150 is connected to an adjustable resistor 156 connectable through a normally open contact 157 of the relay 128 to a power supply terminal (preferably at plus 24 volts to ground) or through a normally open contact 159 of the relay 127 to a line 160. Input terminal 151 is connected through an adjustable resistor 163 to a diode 164, connectable through a contact 165 of the relay 128 to the terminal 158 or through a normally open contact 166 of the relay 127 to a line 167. Input terminal 152 is connectable through a normally open contact 169 of the relay 128 to the line 167 or through a normally open contact 170 of the relay 127 to ground.

Line 155 is arranged to be placed at a potential corresponding to the unit having the least running time, of those not in operation. For this purpose, line 155 is connected through diodes 171–174 and normally closed contacts 175–178 of relays 179–182 to input terminals 102, 107, 112 and 117, which are connected to the outputs of the running time potentiometers of the respective units. Relays 179–182 are connected to the 420 cycle breaker controls of the respective units to be energized when the respective unit is on the line.

Line 160 is arranged to be supplied with a potential corresponding to the running time of the operating unit having the greatest running time. For this purpose, line 160 is connected through diodes 183–186 and normally open contacts 187–190 of the relays 179–182 to the input terminals 102, 107, 112 and 117.

Terminals 102, 107, 112 and 117 are additionally connected to contacts 191–194 operated by a lobe of the selector or scanning switch cam 133. Contacts 191–194 are normally urged into engagement with contacts connected through resistors 197–200 to a line 201, but are operable by the cam lobe 195 into engagement with contacts which are connected to the line 167. Line 201 is connectable through a normally open contact 202 of the relay 127 to ground or through a normally open contact 203 of the relay 128 to the power supply terminal 158.

To illustrate the operation of the circuit as thus far described, assume that units 21 and 22 are in operation, that the load one one of the units 21 and 22 exceeds 90% of rated value and that of the units 23 and 24, the unit 23 has the lesser running time. Under such conditions, relays 179 and 180 are energized to disconnect line 155 from input terminals 102 and 107, and line 155 is connected through the diodes 173 and 174 to the terminals 112 and 117. With unit 24 having the lesser running time, the potential of line 155 is then equal to that of the terminal 117. When the load on the unit having the highest load then exceeds 90% of rated value, the relay 128 is energized to close all contacts thereof and to energize the motor 132. The input terminals 150 and 151 are then connected through resistor 156 and resistor 163 and diodes 164 to the power supply terminal 158, while input terminal 149 is connected to the line 155 and input terminal 152 is connected to the line 167. In the illustrated position of the cam lobe 195, line 167 is connected to terminal 102, connected to the running time potentiometer of the unit 21, which will not under the assumed conditions be equal to the potential of the line 155. No null will then be produced, the relay 136 will not be energized from the output of the magnetic amplifier 142, and energization of the motor 132 will be maintained. Assuming counterclockwise rotation of the cams 133 and 134, the contacts 192 and 193 will be sequentially operated, but no null condition will be produced, since under the assumed conditions, the potential of the line 155 will differ from the potentials of the terminals 107 and 112. However, when the cam lobe 195 operates the contact 194, the line 167 will be placed at a potential substantially equal to that of the line 155, under the assumed conditions, and a null will be produced in the input of the magnetic amplifier 142. The relay 136 will then be energized from the output of the magnetic amplifier 142 and the contact 137 will be opened to deenergize the scanning drive motor 132 while the contact 138 will be closed to energize the relay 140. As described hereinafter, the unit 24 will then be started but before describing that operation, another set of assumed conditions will be considered to illustrate the operation of the null sensing network in response to a load of less than 40% rated load.

As a second example, assume again that units 21 and 22 are in operation, that the unit 22 has the greater running time, and that the load on the unit having the greatest load then drops below 40% of rated value. Under such conditions, relays 179 and 180 will be energized, and line 160 will be connected to terminals 102 and 107 through contacts 187 and 188 of the relays 179 and 180 and also through the diodes 183 and 184. With unit 22 having the greater running time, the potential of the terminal 107 will be greater than that of the terminal 102, and the potential of the line 160 will be substantially equal to that of the terminal 107. When relay 127 is then operated from the 40% level sense circuit 121, under the assumed conditions, the various normally open contacts thereof will be closed and among other things the motor 132 will be energized. Under such conditions, input terminals 149 and 152 of the magnetic amplifier 142 will be grounded, while input terminals 150 and 151 will be connected through the resistor 156 and through the resistor 163 and the diode 164 to the lines 160 and 167 respectively. In the illustrated position of the cam lobe 195, line 167 will be connected to the terminal 102 and its potential under the assumed conditions will not be equal to that of the line 160, so that no null will be produced in the input circuit of the magnetic amplifier, and the relay 136 will not be energized. Accordingly, the cams 133 and 134 may be driven by the motor and assuming counterclockwise rotation, the contact 192 will next be operated by the cam lobe 195 to connect the line 167 with the terminal 107. Under the assumed conditions, the potentials of the lines 160 and 167 will then be substantially the same, a null will be produced in the input circuit of the magnetic amplifier 142, and the relay 136 will be energized to deenergize the motor 132 and energize the relay 140. The unit 22 will then be shut down until only the unit 21 is in operation.

To effect starting or shutting down of the respective units, contacts 205, 206, 207 and 208 are arranged to be operated by a lobe 209 of the cam 134. Contacts 205–208 are normally spring-urged into engagement with contacts which are connected to terminals 104, 109, 114 and 119 and are also connected to terminals 103, 108, 113 and 118, through contacts 211–214 in the deenergized condition of the relay 140. The contacts 205–208 are, however, actuatable by the cam lobe 209 into engagement with contacts which are respectively connected to terminals 105, 110, 115 and 120, through normally closed contacts 215–218 of the relay 127.

In the energized condition of the relay 140, contacts 205–208 are connected through contacts 211–214 of the relay 140 to the terminals 103, 108, 113 and 118.

In operation, assuming that cam lobe 209 is in the illustrated position and that the shut-down relay 127 is energized, energization of the relay 140 will open the circuit between terminals 103 and 104 to open the circuit to the relay 88, shown in FIGURE 2, to open the contact 90 and to shut down the unit 21. Those of the other units then operating, however, will remain operating because terminals 108, 113 and 118 will remain connected to terminals 109, 114 and 119 through the contacts 212–214 and the contacts 206–208. The other units may, of course, be shut down in a similar fashion depending upon the position of the cam lobe 209.

Again assuming that cam lobe 209 is in the illustrated position, and assuming that the start relay 128 is energized with the shut-down relay 127 deenergized, the terminal 103 will be connected through the contact 211, the contact 205 and the contact 215 to the terminal 105, thereby energizing the relay coil 88 to start the unit 21. The other units may, of course, be started in a similar fashion, depending upon the position of the cam lobe 209.

FIGURE 4 shows the circuit of the load monitor 71 which comprises a pair of transformers 221 and 222 having primary windings 223 and 224 connected to input terminals which are respectively connected to the 60 cycle and 420 cycle current transformers 72 and 73. The transformers 221 and 222 have secondary windings 225 and 226 connected to a first bridge rectifier composed of diodes 227 and a second bridge rectifier composed of diodes 228. One output terminal of each rectifier is grounded while the other output terminals thereof are connected through resistors 229 and 230 to circuit points which are connected through capacitors 231 and 232 to ground and through adjustable resistors 233 and 234 to the input of an amplifier 235 having an output connected to terminal 236 which is connected to the terminal 234 as illustrated in FIGURE 2.

In operation, the rectifiers produce D.C. output voltages which are respectively proportional to the 60 cycle and 420 cycle load currents, such voltages being filtered by the resistors 229 and 230 and the capacitors 231 and 232, and being combined and applied to the amplifier 235 through the resistors 233 and 234. Thus a signal is applied to the amplifier which is proportional to the combined loads on the 60 cycle and 420 cycle alternators.

FIGURE 5 is a diagram of the 40% load level sense circuit 121. Input terminal 123 is connected through a resistor 241 to a circuit point connected through a capacitor 242 and a potentiometer 243 to ground. The movable contact of the potentiometer 243 is connected to the base of a resistor 244 and also through a pair of diodes 245 to the emitter of the transistor 244 which is connected through a resistor 245a to ground and to the emitter of a second transistor 246. The collector of the transistor 244 is connected through a resistor 247 to a power supply terminal 248 and also through a resistor 249 to the base of the transistor 246 which is connected through a resistor 249a to ground. The collector of the transistor 246 is connected through a relay 250 to the power supply 248 which is connected through a normally open contact 251 of the relay 250 to a time delay relay 252. Power supply terminal 248 is also connected through a normally open contact 253 of the time delay relay 252 to an output terminal 254. A second output terminal 255 is connected to ground.

In operation, when the input voltage is zero, the transistor 244 is non-conductive, to place the collector thereof at a potential approaching that of the power supply terminal 248 and the transistor 246 conducts heavily, to energize the relay 250 which closes the contact 251 to energize the time delay relay 252 and after a certain delay, on the order of 20 seconds, contact 253 is closed, to apply a signal to the output terminal 254. However, when the input voltage reaches a certain level dependent upon the setting of the potentiometer 243, the transistor 244 is rendered conducting to drop the potential of the collector thereof, and to cut off the transistor 246, to thereby deenergize the relay 250 and the relay 252.

Accordingly, the potentiometer 243 may be set to cause energization of the relays 250 and 252 at load levels below a certain predetermined value, preferably on the order of 40% of the rated load of one unit.

FIGURE 6 is a diagram of the 90% load level sense circuit 122 which is very similar to the circuit 121, and includes a potentiometer 257 corresponding to potentiometer 243, transistors 258 and 259 corresponding to transistors 244 and 245, a relay 260 corresponding to the relay 250 and a power supply terminal 261 corresponding to terminal 248. In this circuit, however, the relay 260 has a normally closed contact 262 which is connected between the power supply terminal 261 and an output terminal 263, a second output terminal 264 being grounded.

In the operation of the circuit 122, the transistor 259 is normally conductive to energize the relay 260 and open the contact 262 to disconnect terminal 263 from the power supply terminal 261. However, the potentiometer 257 may be set to cause operation at a predetermined load level, preferably 90% of the rated load of one unit, whereupon the transistor 258 is rendered conductive, to cut off the transistor 259, and to deenergize the relay 260 whereupon the contact 262 is closed, to connect power supply terminal 261 to the output terminal 263.

The sequencing control system as illustrated thus automatically starts and stops the units according to load demands in a manner to obtain high efficiency while preventing overload of any unit. In addition, when operated over a substantial period of time, it automatically equalizes the running times of the units and wearing thereof. It should be noted that if in initiating operation of a system with all units being new or overhauled, the potentiometers are all set at zero running time, the units will all reach a condition requiring overhaul at the same time, which may be a disadvantage. If desired, the initial settings of the potentiometers may be changed, or resistances may be connected in circuit therewith, to produce a staggered relation of accumulated running times, and to permit staggering of overhaul of the units, while still obtaining the advantage in which the running times of the units are equalized over a substantial period of time. The term "effective running time" as used herein is to be construed to cover such a staggered relationship.

It will be understood that modifications and variations may be effected without departing from the spirit and scope of the novel concepts of this invention.

We claim as our invention:

1. In a system for supplying electrical power to a load,
   a plurality of units each comprising:
      a generator,
         prime mover means for driving said generator,
         control means for controlling starting and stopping of said prime mover means and electrical connection of said generator to said load,
         and load sensing means for sensing the power supplied by said generator,
   and a sequencing unit comprising:
      means coupled to the load sensing means of all of said units for reading the load of the unit having the highest load,
      means for developing a control signal in response to said coupling means when the load read by said coupling means exceeds a certain value, and
      means for applying said control signal to said control means of one of said units.

2. In a system for supplying electrical power to a load,
   a plurality of units each comprising:
      a generator,
      prime mover means for driving said generator,
      control means for controlling starting and stopping of said prime mover means and electrical connection of said generator to said load,
      load sensing means for sensing the power supplied by said generator,
      and means for developing a running time signal corresponding to the effective running time of the unit,
   and a sequencing unit comprising:
      means coupled to the load sensing means of all of said units for developing a control signal when the load on the unit having the highest load shifts between a value above and a value below a certain value,
      and means responsive to said running time signals for applying said control signal to said control means of one of the units.

3. In a system for supplying electrical power to a load,
   a plurality of units each comprising:
      a generator,
      prime mover means for driving said generator,
      start control means for starting said prime mover means, accelerating said generator to operating speed and electrically connecting said generator to said load, stop control means for stopping operation of said prime mover means, and load sensing means for sensing the power supplied by said generator, and a sequencing unit comprising:

means coupled to the load sensing means of all of said units for reading the load of the unit having the highest load, means for developing a start control signal in response to said coupling means when the load read by the coupling means exceeds a certain value, means for applying said start control signal to the start control means of a unit not in operation, means for developing a stop control signal in response to said coupling means when the load read by the coupling means falls below a certain value, and means for applying said stop control signal to an operative unit to discontinue operation thereof.

4. In a system for supplying electrical power to a load, a plurality of units each comprising:

a generator, prime mover means for driving said generator, control means for controlling starting and stopping of said prime mover means and electrical connection of said generator to said load, and load sensing means for developing a load signal having a magnitude proportional to the power supplied by said generator, and a sequencing unit comprising:

a threshold circuit operative to develop an output signal when an input signal thereto shifts between a value below and a value above a certain value, a plurality of unidirectional conduction devices coupling the load signals from the units to the input of said threshold circuit, and means applying said output signal from said threshold circuit to the control means of one of said units, whereby said unidirectional conduction devices develop a signal reflective of the unit having the highest load such that said threshold circuit is controlled by the load of the unit having the highest load.

5. In a sequencing system for controlling operation of alternators connected to a common load, null circuit means having two inputs and arranged to develop an output signal when the signals applied to said inputs are effectively equal, means for applying to one of said inputs a signal corresponding to the effective running time of the alternator having the highest running time, scanning switch means movable sequentially through a plurality of positions respectively corresponding to said alternators and arranged to sequentially apply to the other of said inputs signals corresponding to the effective running times of the respective alternators, means responsive to an output signal from said null circuit for stopping said sensing switch means, and means for stopping operation of the alternator which corresponds to the position of said scanning switch means.

6. In a sequencing system for controlling operation of alternators connected to a common load, null circuit means having two inputs and arranged to develop an output signal when the signals applied to said inputs are effectively equal, means for applying to one of said inputs a signal corresponding to the effective running time of the alternator having the lowest running time, scanning switch means movable sequentially through a plurality of positions respectively corresponding to said alternators and arranged to sequentially apply to the other of said inputs signals corresponding to the effective running times of the respective alternators, means responsive to an output signal from said null circuit for stopping said sensing switch means, and means for starting operation of the alternator which corresponds to the position of said scanning switch means.

7. In a system for supplying electrical power to a load, a plurality of units each comprising:

a generator, prime mover means for driving said generator, starting control means for starting said prime mover means, accelerating said generator to operating speed and electrically connecting said generator to said load, stop control means for stopping operation of said prime mover means, load sensing means for sensing the power supplied by said generator, and means for developing a running time signal corresponding to the effective running time of the unit, and a sequencing unit comprising:

means coupled to the load sensing means of all of said units for developing a start control signal when the load on any unit exceeds a certain value, and means responsive to said running time signals for applying said start control signal to the start control means of a unit having the least running time.

8. In a system for supplying electrical power to a load, a plurality of units each comprising:

a generator, prime mover means for driving said generator, starting control means for starting said prime mover means, accelerating said generator to operating speed and electrically connecting said generator to said load, stop control means for stopping operation of said prime mover means, load sensing means for sensing the power supplied by said generator, and means for developing a running time signal corresponding to the effective running time of the unit, and a sequencing unit comprising:

means coupled to the load sensing means of all of said units for developing a stop control signal when the highest load on one unit drops below a certain value, and means responsive to said running time signals for applying said stop control signal to the stop control means of a unit having the greatest running time.

9. In a system for supplying electrical power to a load, a plurality of units each comprising:

a generator, prime mover means for driving said generator, starting control means for starting said prime mover means, accelerating said generator to operating speed and electrically connecting said generator to said load, stop control means for stopping operation of said prime mover means, load sensing means for sensing the power supplied by said generator, and means for developing a running time signal corresponding to the effective running time of the unit, and a sequencing unit comprising:
  means coupled to the load sensing means of all of said units for developing a start control signal when the load on any unit exceeds a certain value,
  means responsive to said running time signals for applying said start control signal to the start control means of a unit having the least running time,
  means coupled to the load sensing means of all of said units for developing a stop control signal when the highest load on one unit drops below a certain value,
  and means responsive to said running time signals for applying said stop control signal to the stop control means of a unit having the greatest running time.

10. In a system for supplying electrical power to a load, a plurality of units each comprising:
  a generator,
  prime mover means for driving said generator,
  starting control means for starting said prime mover means,
  accelerating said generator to operating speed and electrically connecting said generator to said load,
  stop control means for stopping operation of said prime mover means,
  load sensing means for sensing the power supplied by said generator,
  and means for developing a running time signal corresponding to the effective running time of the unit, and a sequencing unit comprising:
  means coupled to the load sensing means of all of said units for developing a start control signal when the load on any unit exceeds a certain value,
  null circuit means having two inputs and arranged to develop an output signal when the signals applied to said inputs are effectively equal,
  means for applying to one of said inputs a signal corresponding to the effective time of the unit having the lowest running time,
  scanning switch means movable sequentially through a plurality of positions respectively corresponding to said units and arranged to sequentially apply to the other of said inputs signals corresponding to the effective running times of the respective units,
  means responsive to an output signal from said null circuit for stopping said scanning switch means,
  and means for applying said start control signal to the start control means of the unit which corresponds to the position of said scanning switch means.

11. In a system for supplying electrical power to a load, a plurality of units each comprising:
  a generator,
  prime mover means for driving said generator,
  starting control means for starting said prime mover means,
  accelerating said generator to operating speed and electrically connecting said generator to said load,
  stop control means for stopping operation of said prime mover means,
  load sensing means for sensing the power supplied by said generator,
  and means for developing a running time signal corresponding to the effective running time of the unit, and a sequencing unit comprising:
  means coupled to the load sensing means of all of said units for developing a stop control signal when the highest load on one unit stops below a certain value,
  null circuit means having two inputs and arranged to develop an output signal when the signals applied to said inputs are effectively equal,
  means for applying to one of said inputs a signal corresponding to the effective running time of the unit having the highest running time,
  scanning switch means movable sequentially through a plurality of positions respectively corresponding to said units and arranged to sequentially apply to the other of said inputs signals corresponding to the effective running times of the respective units,
  means responsive to an output signal from said null circuit for stopping said scanning switch means,
  and means for applying said stop control signal to the stop control means of the unit which corresponds to the position of said scanning switch means.

References Cited by the Examiner
UNITED STATES PATENTS

| | | | |
|---|---|---|---|
| 1,798,704 | 3/1931 | Ross et al. | 307—65 |
| 2,832,896 | 4/1958 | Stineman et al. | 307—87 |
| 2,843,760 | 7/1958 | Kahle. | |
| 2,872,591 | 2/1959 | Stineman | 290—4 |
| 3,235,743 | 2/1966 | Ryerson et al. | 290—30 |

ORIS L. RADER, *Primary Examiner.*

G. SIMMONS, *Assistant Examiner.*